No. 647,305. Patented Apr. 10, 1900.
W. R. KINNEAR.
HORSESHOE CALK.
(Application filed Jan. 11, 1899.)
(No Model.)

Witnesses
Harry S. Rohrer
Edwin L. Bradford

Inventor
William R. Kinnear,
by Finckel & Finckel,
Attorneys

THE NORRIS PETERS CO., PHOTO-LITHO., WASHINGTON, D. C.

UNITED STATES PATENT OFFICE.

WILLIAM R. KINNEAR, OF COLUMBUS, OHIO.

HORSESHOE-CALK.

SPECIFICATION forming part of Letters Patent No. 647,305, dated April 10, 1900.

Application filed January 11, 1899. Serial No. 701,793. (No model.)

*To all whom it may concern:*

Be it known that I, WILLIAM R. KINNEAR, a citizen of the United States, residing at Columbus, in the county of Franklin and State of Ohio, have invented certain new and useful Improvements in Horseshoe-Calks; and I do hereby declare the following to be a full, clear, and exact description of the invention, such as will enable others skilled in the art to which it appertains to make and use the same.

The object of my present invention is to provide an improved form of calk of the kind shown in Letters Patent of the United States granted to me March 1, 1898, No. 599,712.

My present invention consists in providing the tread of a hollow cylindrical calk with one or more recesses or indentations and beveling the edge thereof preferably inward, so that when the outer edges or points are worn down new sharp edges are presented to take firm hold of the pavements.

Figure 1:
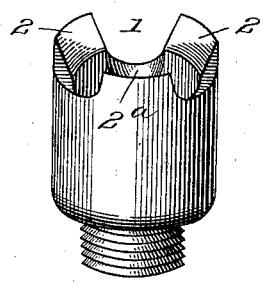
Figure 2:
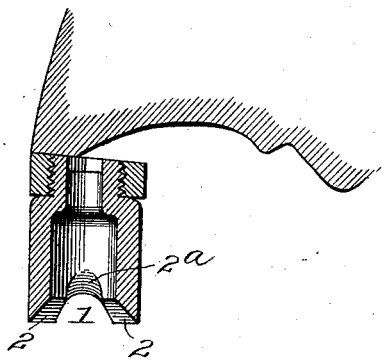
Figure 3:
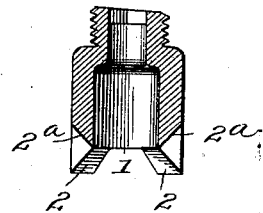

In the accompanying drawings, Figure 1 is a perspective view of a calk embodying my improvements. Fig. 2 is a central longitudinal sectional view showing the calk in a section of shoe. Fig. 3 is one modification of the principle of construction, illustrating the preceding views.

Like characters of reference mark corresponding parts.

As before stated, the calk is of hollow or tubular form, and one end is furnished with a tread to enter and engage the shoe. This end is also furnished with a socket or hole adapted to receive a wrench, by means of which the calk is turned into and out of the shoe. In the tread of the calk I form one or more recesses 1, so as to provide a plurality of points, and bevel the edges of those points as well as the edges at the bases of the recesses, as indicated at 2 and $2^a$, so as to render them sharp and penetrative not only when the calk is new, but also after the points have been worn off.

Instead of beveling all edges from the outer side of the calk inward, as indicated in Figs. 1 and 2, I may bevel one part inward and the other outward, as shown in Fig. 3; but instead of beveling the outer part inward and the inner part outward, as shown in Fig. 3, I may bevel the outer parts outward and the inner parts inward. I may also bevel all parts outward. At present the preferred mode of beveling is shown in Figs. 1 and 2; but the essence of my invention resides, as before stated, in recessing and beveling the tread edge of a hollow calk.

What I claim, therefore, and desire to secure by Letters Patent, is—

1. A removable horseshoe-calk having a plurality of points or projecting edges, the outer points or edges being beveled so as to be sharp, and the edges between the bases of the projecting portions or points also being beveled so as to be sharp, substantially as described.

2. A removable horseshoe-calk having a plurality of points or projecting edges, the outer points or projecting edges being beveled so as to be sharp, and the edges between the bases of the projecting portions or points being beveled inwardly so as to be sharp, substantially as described.

In testimony whereof I affix my signature in presence of two witnesses.

WILLIAM R. KINNEAR.

Witnesses:
 GEORGE W. ALFRED,
 GEORGE M. FINCKEL.